United States Patent [19]

Beshoory et al.

[11] Patent Number: 5,690,434
[45] Date of Patent: Nov. 25, 1997

[54] DOWNHOLE TOOL BEARING ASSEMBLY

[75] Inventors: Edward Joseph Beshoory; William David Murray, both of Houston, Tex.

[73] Assignee: Bafco International Incorporated, Houston, Tex.

[21] Appl. No.: 638,379

[22] Filed: Apr. 26, 1996

Related U.S. Application Data

[63] Continuation of Ser. No. 285,336, Aug. 2, 1994, abandoned.
[51] Int. Cl.$^6$ .............................. F16C 19/10; E21B 4/02
[52] U.S. Cl. .............................. 384/613; 175/107; 384/97
[58] Field of Search .............................. 384/92, 95, 97, 384/613, 617, 619; 175/107

[56] References Cited

U.S. PATENT DOCUMENTS

| | | | |
|---|---|---|---|
| 3,449,030 | 6/1969 | Tirapolsky et al. | 384/613 X |
| 4,011,917 | 3/1977 | Tirapolsky et al. | 175/107 |
| 4,260,202 | 4/1981 | Crase et al. | 384/613 X |
| 4,295,535 | 10/1981 | Crase et al. | 175/107 X |
| 4,361,194 | 11/1982 | Chow et al. | 175/107 |
| 4,388,973 | 6/1983 | Winkelmann et al. | 175/107 X |
| 4,501,454 | 2/1985 | Dennis et al. | 384/619 |
| 4,665,997 | 5/1987 | Mauer et al. | 175/107 |
| 4,729,675 | 3/1988 | Trzeciak et al. | 384/613 |
| 5,074,681 | 12/1991 | Turner et al. | 384/613 |
| 5,248,204 | 9/1993 | Livingston et al. | 384/97 |

FOREIGN PATENT DOCUMENTS

| | | | |
|---|---|---|---|
| 210680 | 8/1960 | Austria | 384/613 |

Primary Examiner—Thomas R. Hannon
Attorney, Agent, or Firm—Douglas W. Rommelmann; John Moetteli

[57] ABSTRACT

A downhole tool bearing assembly is provided which utilizes a secondary annular threaded locknut and a compression ring in order to take up tolerance stack-up and to provide supplemental preload through a bearing housing assembly, thus helping to ensure against accidental disassembly during operation. The bearing housing assembly is comprised of a prepackaged subassembly of thrust bearings, sleeves and, optionally, "BELLEVILLE"-type disk springs which can be quickly and easily installed onto a downhole tool drive shaft or other similar apparatus by maintenance personnel having a minimum of training. The bearing housing assembly is designed such that reconfiguration involves little more than removal and reinstallation in the opposite orientation, thereby overcoming the need to reconfigure the bearing assembly one bearing at a time.

8 Claims, 3 Drawing Sheets

5,690,434

DOWNHOLE TOOL BEARING ASSEMBLY

This application is a continuation of an application filed Aug. 2, 1994, entitled "DOWNHOLE MOTOR BEARING ASSEMBLY", Ser. No. 08/285,336 now abandoned.

TECHNICAL FIELD

This invention relates generally to new and improved bearing assemblies for use in the turning-shaft thrust bearing systems of heavy-duty power transmissions. More specifically, the invention relates to new and improved downhole tool bearing assemblies designed to withstand both axial and radial loading.

BACKGROUND

Heavy equipment rotating shafts which are subject to compound loading situations must often resist both axial bi-directional thrust loads and radial side loads. Oil field drilling systems in which a drill bit is powered by a downhole motor are loaded in just such a manner. In such motors the drill bit is powered by a rotor which is turned within a stator as high-pressure drilling mud or some other fluid is pumped through it. As an alternative to this Moineau-type motor, other fluid turbine operated motors may be used, as well as electrically powered motors which do not rely of the flow of this fluid to power the drill bit. Regardless of the type of motor used, the motor is one source of the axial thrust forces which must be supported in order for the system to operate for a reasonable period before requiring maintenance or replacement. Other sources of axial and radial drilling forces include the weight of the drill string, and the necessity of drilling through strata which may be angled obliquely with respect to the drilling axis. If the densities of this strata vary, this will cause significant radial side loads in the downhole motor bearing assembly. It is imperative that these forces be resisted if the drill is to effectively and efficiently perform its function.

U.S. Pat. No. 4,729,675 to Trzeciak et al is directed to a bearing assembly for supporting the rotor of a downhole motor. The '675 patent describes a means for interchangeably positioning sleeve members in a housing and on a shaft in order to arrange the bearing members in selected interchangeable relationship to support a load in a forward or reverse direction. The means described utilizes stacked bearings, bearing sleeve members and disk springs (i.e. BELLEVILLE-type springs). The sleeve members may be interchanged to vary bearing load carrying characteristics according to the amount of upward or downward thrust which may be encountered by the drive shaft during a particular drilling operation. In order to reconfigure the assembly for changing drilling conditions during the course of a single drilling operation, the '675 design must be removed from the hole along with the entire drill string. Once out of the hole, the bearing stack must be reconfigured individually, one bearing at a time. This can be both time consuming and complicated.

U.S. Pat. No. 4,665,997 to Maurer describes a bearing assembly construction which allows for the interchangability and the repositioning of the bearings for supporting a given amount of upward and downward thrust. However, the construction described requires a piece-by-piece breakdown and build-up of the bearing assembly in order to reconfigure it for different loading conditions. This process is both cumbersome, time-consuming and relatively complicated.

U.S. Pat. No. 5,074,681 to Turner et al describes a bearing assembly similar to that of the '675 patent except that additional disk springs are incorporated in a manner which better ensures that all thrust races and their respective ball bearing sets are in contact irrespective of the direction of the axial thrust loads. The goal of the '681 device is to minimize the frequency of replacement of the thrust bearing stack through the use of shock absorbing disk springs. Though the device may accomplish this goal when used in a nominal and otherwise highly predictable drilling operation, it remains necessary to reconfigure the bearing sets for off-nominal or changed drilling conditions. Due to the accelerated wear experienced when drilling through successive strata of varied density (a circumstance often encountered in downhole drilling operations) the bearing sets must at times be replaced or reconfigured after only a very few hours of operation. Ideal conditions are rare, making reconfiguration an economic necessity in off-nominal or extreme unidirectional loading situations. In this regard, the '681 device is no less difficult to reconfigure than the '675 device. In fact, it is likely that it would be more difficult to reconfigure, considering that the pressure between opposed thrust bearings must now be balanced through the careful selection and arrangement of disk springs, shims and spacers as is evident from Table I and II of the '681 patent.

The rapid depletion of shallow oil fields which permitted easy access and extraction in the early days of crude oil production has necessitated the development of drilling bits and motor assemblies which are more rugged and durable or which can be maintained more easily in order to enable the cost-effective exploitation of the remaining fields. More efficient drilling systems allow production rates to be maintained despite the increased difficulty of extracting oil from the remaining, more challenging and often deeper oil fields. Working these more challenging fields has imposed the requirement that downhole tool bearing assemblies resist higher cyclical axial loads to such an extent that the traditional means of replacing and/or reconfiguring these bearing stacks can work a hardship on maintenance personnel.

The downhole motor assembly from Beefield, Incorporated includes an integrated thrust bearing cassette. This product includes one internal and one external cylindrical support sleeve supporting an even number of thrust bearings having both stationary and rotating races. The internal support sleeve is fastened to rotating races on its ends via setscrews which enter from the inside of the internal support sleeve and extend into an annular substantially cylindrical groove in each such race. However, the stationary races are not locked against relative rotation with the outer cylindrical support sleeve, as is the present invention. In cassettes having stacks of four or less thrust bearings, an even number of thrust bearings forecloses the possibility of being able to vary the ability of the cassette to resist up and down thrust loads by simply removing the cassette and reinstalling the cassette in the opposite orientation. In addition, the cylindrical groove into which the setscrew is turned does not have a conical surface, and therefore does not have the ability to draw the races and internal support sleeve into closer engagement.

Although several of the prior art inventions recognized the need for and advantage of reconfiguring the bearing stack to accommodate differing load conditions, none has sought to accomplish this goal using an integrated thrust bearing cassette with an odd number of thrust bearings of an orientation which permits reconfiguration by simply removing and reinstalling the cassette in the opposite orientation. Therefore, a need exists for such a device which represents a simple and reliable means of reconfiguring the bearing stacks to suit these demanding applications.

U.S. Pat. No. 4,361,194 to Chow describes a retainer nut whose purpose is to support the bearing elements in longitudinal alignment. Although the embodiments described therein rely on this nut as the means of removing tolerance stack-up clearances, Chow makes no mention of its use as a primary source of locking preload to the thrust bearing assembly. In addition, Chow describes no provision for mechanically locking the retainer nut in place. A need therefore exists for an improved means of imparting a preload to the bearing assembly and of preventing the bearing assembly from loosening during high-impact operation.

The prior art bearing assemblies described above rely primarily on spacers which must be custom ground or machined to take up any tolerance stack-up in the assembly and to apply a compressive preload—the size of the spacer needed changes due to wear, dirt buildup, corrosion etc. During a routine maintenance cycle, the technician must disassemble the bearing pack and housing, re-assemble it without a spacer, and take measurements, comparing the size of the gap to be filled with the current spacer size. If the gap size has changed, it will be necessary to fabricate a spacer of a new prescribed thickness in order to attain the preload desired when installed. Often the thickness of the spacer is relied on to aid in determining whether the desired preload has been attained. The spacer is ground to a thickness slightly greater than the width of the gap to be filled. If the preloading member is torqued down until a definable surface on the housing is reached, then the technician is reasonably assured the prescribed preload is attained. This method is time-consuming, costly and is not conducive to field adjustment. A need therefore exists for an improved means of taking up tolerance stack-up and applying a compressive preload which can be more easily performed in the field at the drill site.

SUMMARY

It is therefore one object of the present invention to provide a new and improved bearing assembly for use in turning-shaft thrust bearing systems. More specifically, the first object of this invention is to provide a new and improved downhole tool bearing assembly designed to withstand both axial and radial loading and to allow for easy reconfiguration or replacement during routine maintenance operations.

In order to completely eliminate the need of machining or grinding a spacer to a prescribed size, the preferred embodiment of the present invention utilizes (1) a compression sleeve, (2) a locknut for use on the compression sleeve, (3) a compression ring feature and (4) disk springs. One result of this improvement is that significant time savings are now realized. Easily an hour of labor and $10–20 of machining cost are saved every time a technician is required to maintain a motor. Another result is that the assembly is less likely to come loose due to downhole vibrations, and has improved resistance to shock loads.

In the preferred embodiment, the compression ring is designed to preload all the rotating members of the bearing assembly. This includes all the sleeves that are attached to the drive shaft, all the rotating portions of the radial bearings (the inner radial bearing sleeves) and rotating bearing thrust races. The desired preload is attained by simply torquing the compression ring down to a particular value read from a special torque table or chart. The number of revolutions of the compression ring required to obtain that preload is now irrelevant—all that is relevant is the torque reading of the torquing device used. When the desired torque is reached, so too is the desired preload. In this manner, the invention eliminates the necessity of taking tedious measurements, which in turn minimizes the opportunity for human error.

In addition, there is an advantage in providing that the thread of the compression ring be opposite in sense to the rotational direction of the drive shaft. This helps ensure that the tendency of any vibrational and shock loads experienced during operation will be to torque the compression ring still tighter, rather than to loosen it. However, if the sense of the thread is in the same direction as the drive shaft rotation, other locking means may be provided such as a lock washer, setscrew, or thread locking compound.

A locknut is provided which, in cooperation with a compression sleeve (i.e. the lower stationary radial bearing half), helps maintain a preload through all the stationary components of the radial bearing assembly. The friction generated by this preload between contacting surfaces keeps all the stationary components from rotating. However, it should be emphasized that the locknut does not provide the preload force to keep the components stationary—the lower radial bearing half transmits the preload force to the lower surface of the stationary external sleeve. The locknut helps prevent loosening of the assembly in a manner similar to that of a conventional jam-nut. This is accomplished by providing an independent frictional interface capable of sustaining a large torque input without adversely affecting stresses within the assembly itself. The ability to accept a large torque input allows the generation of a large amount of frictional resistance to loosening at the locknut interface.

As with the compression ring, providing threads of a sense opposite to the direction of rotation helps assure that the locknut and therefore the bearing assembly does not loosen during operation. In the preferred embodiment, the frictional forces tend to tighten a left hand thread, and loosen a right hand thread due primarily to the fact that the direction of rotation of the drive shaft is clockwise when viewed from above along the axis of rotation. Of course, a right-hand thread may be used as well; however, in this case some locking means should be utilized, such as a setscrew, lockwasher, and/or thread-locking compound.

A disk spring may be disposed between a shoulder on either a rotating internal or stationary external sleeve and a stationary thrust race. Compression of the disk by torquing down the compression ring a pre-set amount at initial assembly imparts a preload to the thrust bearings which helps ensure that the lower thrust race, bearing balls and upper races are always in contact. The disk spring may now act like a shock absorber. When for example the bit hits a rock during a drilling operation, a shock wave is generated that travels up to the bearing assembly. The preload on the disk springs ensures that any gaps which might have existed due to tolerance build-up are closed. This allows the disk springs themselves to begin to absorb these shock loads immediately, thereby significantly reducing any potentially damaging effects. In addition, disk springs have the advantage of providing some damping due to the friction losses one edge incurs as it acts against its reacting surface. The disk springs also help distribute the loads between each bearing cassette and the multiple races within each cassette, thereby allowing the races to carry approximately the same lead. This lead sharing characteristic is due to the fact that the compliance of the bearing assembly with the disk springs is much higher than the bearing assembly which does not utilize disk springs. Again, the disks elastically deform and allow any components which were not previously in contact to make contact and bear their share of the load.

A second object of the present invention is to provide a new and improved bearing assembly for use in combination with downhole tools having means for reconfiguring the bearing assembly according to the amount of upward or downward thrust which it is expected to encounter in the drilling operation. The present invention accomplishes this object by utilizing stacked bearings arranged within interchangeable bearing cassettes in such a manner as to provide a range of possible configurations capable of supporting thrust loads in the upward or the downward direction. A new configuration may now be obtained by merely reversing the direction in which the cassette or cassettes are stacked with respect to one another, according to the particular need in the drilling operation.

A third object of the present invention is to provide a downhole tool bearing assembly at lower cost. Because integrated subassemblies and interchangeable piece parts are used, the present invention is easier to reconfigure and less expensive to manufacture. First, higher piece-part production volumes are made possible thereby reducing the per-piece manufacturing cost. Second, assembly procedures may now be standardized, permitting further reductions in cost of goods sold. Third, the unitized cassette can be assembled during seasonally slow periods and inventoried as a subassembly in volume quantities, thereby reducing the requirement for pre-shipment assembly or for custom reconfiguration to a particular customer's need. This will also ensure availability and help avoid the need to hire contract labor at marginally higher costs during peak production periods. In addition, standardization can reduce field maintenance costs significantly by (1) decreasing the time required to perform a typical maintenance operation, and (2) reducing the level of skill required of the maintenance technician.

BRIEF DESCRIPTION OF THE DRAWINGS

Other objects and advantages of this invention will become readily apparent as the same is better understood by reference to the following detailed description when considered in connection with the accompanying drawings wherein.

DETAILED DESCRIPTION

Figure 1A:
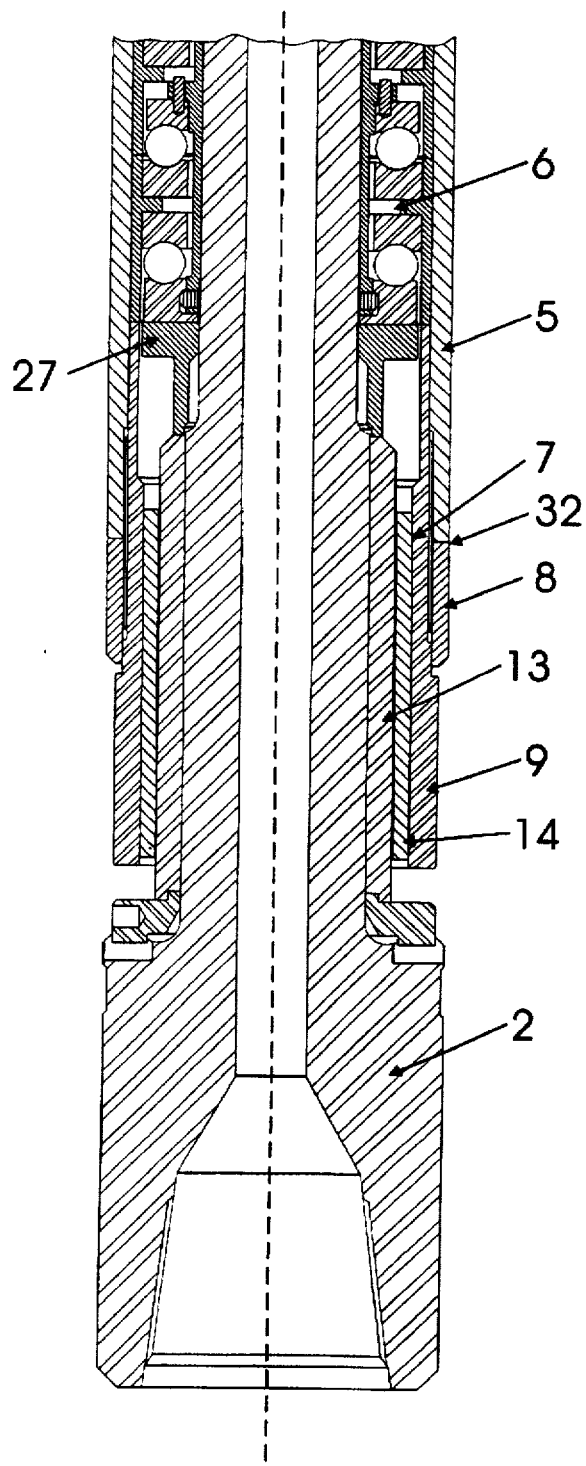
FIG. 1a shows a sectional view of the lower portion of a preferred embodiment of an improved downhole tool bearing assembly.
Figure 1B:
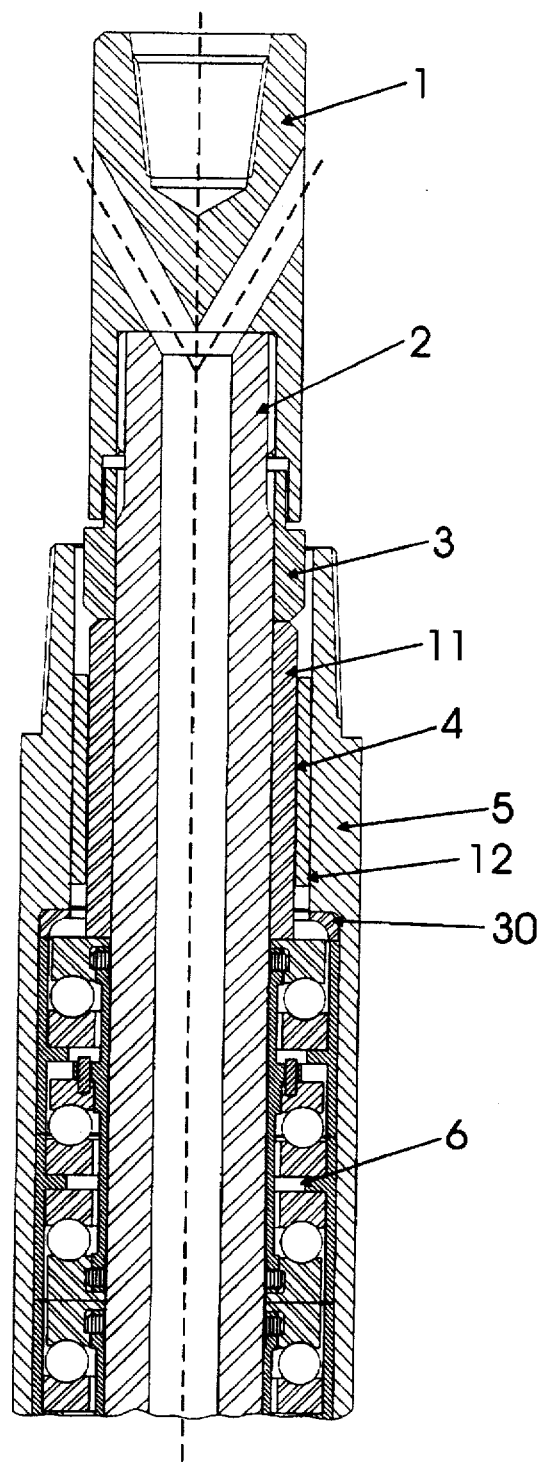
FIG. 1b shows a sectional view of the upper portion of a preferred embodiment of an improved downhole tool bearing assembly.

Referring now to the drawings wherein is shown a preferred embodiment and wherein like reference numerals designate like elements throughout the several views, there is shown in FIGS. 1a and 1b a sectional view of a downhole tool bearing assembly comprising essentially a drive shaft 2 which is rotatably restrained within a bearing housing 5 and supported by a thrust bearing system composed of at least one thrust bearing cassette 6.

Figure 2:
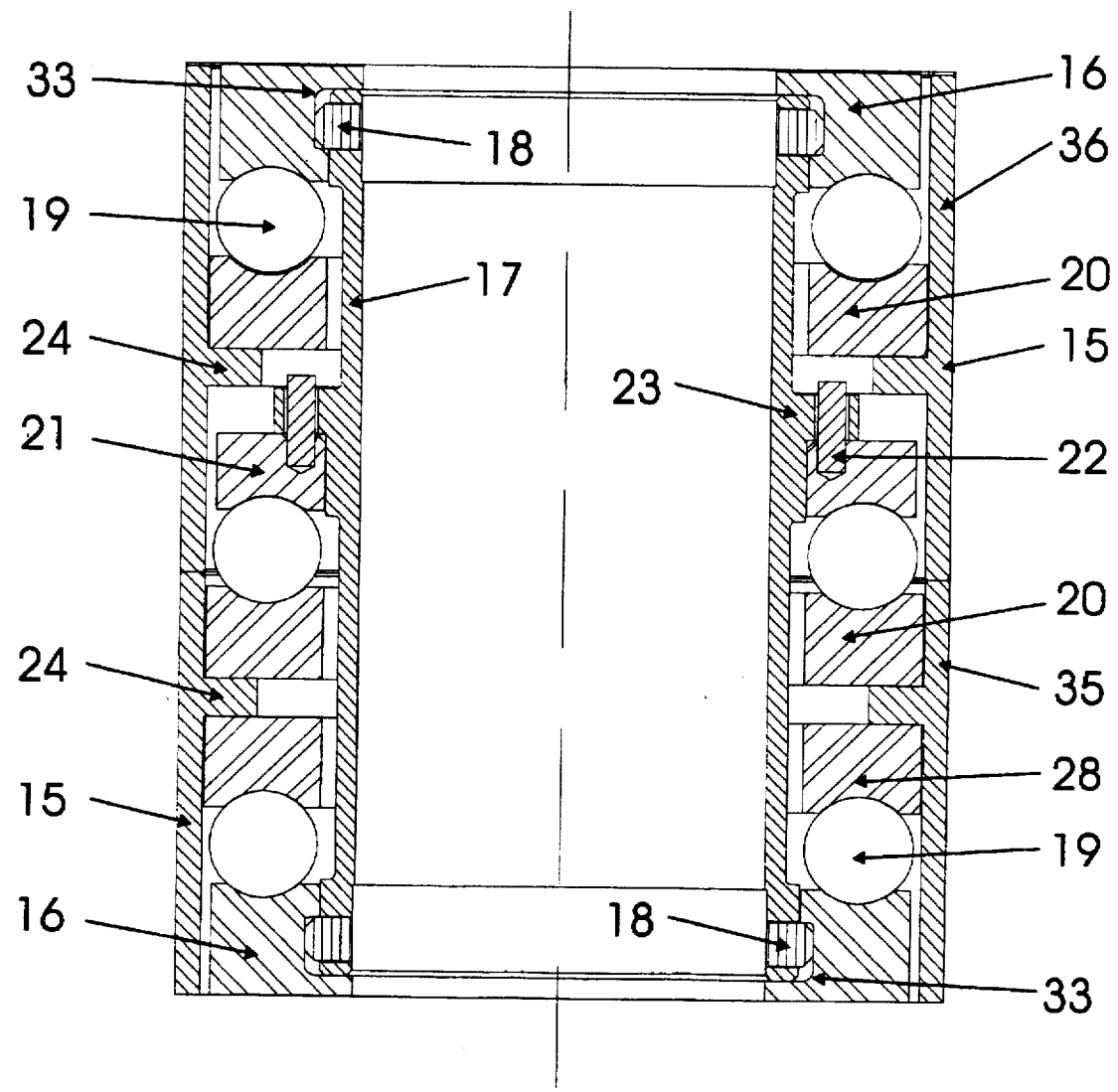
FIG. 2 shows a sectional view of an individual thrust bearing cassette.

In accordance with a first embodiment of the present invention as shown in FIGS. 1a and 1b in which the invention is adapted for use as a downhole motor bearing assembly, a connector 1 connects a power transmission system such as a downhole motor shaft to the bearing assembly. The connector 1 is threaded to the drive shaft 2 and provides for flow of drilling mud through the center of the drive shaft 2. This mud exits the lower end of the drive shaft 2 and enters a drilling bit or other device attached to the drive shaft 2. An upper radial bearing system 4 absorbs any side loads and meters the flow of drilling mud used to cool each thrust bearing cassette 6. The inner radial bearing element 11 is fixed to the rotating drive shaft 2. The outer radial bearing element 12 is fixed to the stationary bearing housing 5. A lower radial bearing system 7 has the same function and purpose as the upper radial bearing system 4. The inner radial bearing element 13 is fixed to the drive shaft 2. The outer radial bearing element 14 is fixed to the lower bearing housing 9. The lower bearing housing 9 is threaded into the bearing housing 5 and shoulders onto the stationary external sleeve 15 of the thrust bearing cassette 6, most clearly depicted in FIG. 2. The lower bearing housing 9 also functions as a compression sleeve in that it is in threaded engagement with the housing 5 such that rotation of the lower bearing housing 9 relative to the bearing housing 5 beyond the point that all the clearances between components are taken up imparts a compressive preload to the stationary components of the downhole tool bearing assembly.

A locknut 8 is threaded to the lower bearing housing 9 and shouldered to the bearing housing 5 creating a frictional locknut interface 32 to insure that the threaded connection does not loosen while in operation. The thrust bearing system made up of individual thrust bearing cassettes 6 is mounted between the upper radial bearing system 4 and lower radial bearing system 7. A rotating thrust race 16 is mounted on the ends of each thrust bearing cassette 6 and is compressed by the upper rotating radial bearing 11 and the lower rotating radial bearing 13. Each cassette utilizes a two-part outer stationary sleeve, designated 35 and 36, in order to provide for ease of assembly.

The rotating thrust races 16 are shouldered against each end of rotating internal sleeve 17, and are loosely held in place by setscrews 18. The rotating thrust races 16 act as annular retaining structures which, when secured in place via the setscrews, further insure that the bearing cassette 6 remains assembled in a cylindrical unit while awaiting installation in a bearing housing assembly. In this preferred embodiment, the thrust bearings are positioned such that two are capable of resisting thrust loadings from one direction while one is capable of resisting thrust loading from the other direction. This arrangement permits the building up of bearing housing assemblies using a standardized thrust bearing cassette, but which may have a variety of up-thrust and down-thrust load bearing characteristics attainable simply by selecting the orientations of these cassettes as they are stacked in series one against the other over the drive train.

The thrust forces from the drilling bit are transferred through the drive shaft 2, and the lower rotating radial bearing 13 through an intermediate member 27 to a rotating thrust race 16 and the rotating internal sleeve 17 through bearing ball 19 and upper thrust race 28 into external sleeves 35 and 36 into spacer 30 and then into the housing 5. The thrust forces from the power transmission system are transferred through the connector 1, the compression ring 3, the upper rotating radial bearing 11, the rotating thrust race 16 through the bearing balls 19 into lower thrust race 20 to the rotating external sleeves 35 and 36 into the compression sleeve or lower radial bearing sleeve 9 and then into the housing 5. During assembly the connector 1 is threaded to the drive shaft 2 to the desired torque. In order to take up any manufacturing tolerances and to provide a compressive preload to the rotating elements of the bearing assembly, an annular threaded ring 3 is threaded to the connector 1 and is interposed over the drive shaft 2 between the connector 1 and the upper rotating radial bearing 11 such that rotation of the ring 3 in a first direction relative to the drive shaft 2 can reduce to zero any axial clearances which might exist in the thrust bearing system. Once any clearance is eliminated, further relative motion of the threaded ring 3 in the first direction with respect to the connector 1 builds a compressive preload helping to ensure that the components of the assembly remain in engagement with respect to each other despite the high shock loads experienced during operation.

Thrust forces are transferred through the rotating thrust races 16, the balls 19, the stationary thrust races 20, the stationary external sleeves 15, and then into the bearing housing 5. A central rotating thrust race 21 is fixed against relative rotation to the rotating internal sleeve 17 by means of pins 22 which extend from the thrust race 21 into the flange 23 on the rotating internal sleeve 17. Utilization of this central thrust race 21 provides for a thrust bearing cassette 6 having two thrust bearing sets positioned to resist thrust loads in one direction and one thrust bearing set positioned to resist thrust loads in the opposite direction. Depending on the direction in which the cassette 6 is installed onto the drive shaft 2, the entire thrust bearing system can be configured to accommodate a variety of upward or downward thrust loading situations. Also, multiple bearing cassettes may be installed to provide even greater thrust capacity and thrust resistance capabilities in the downhole tool bearing assembly.

Figure 3:
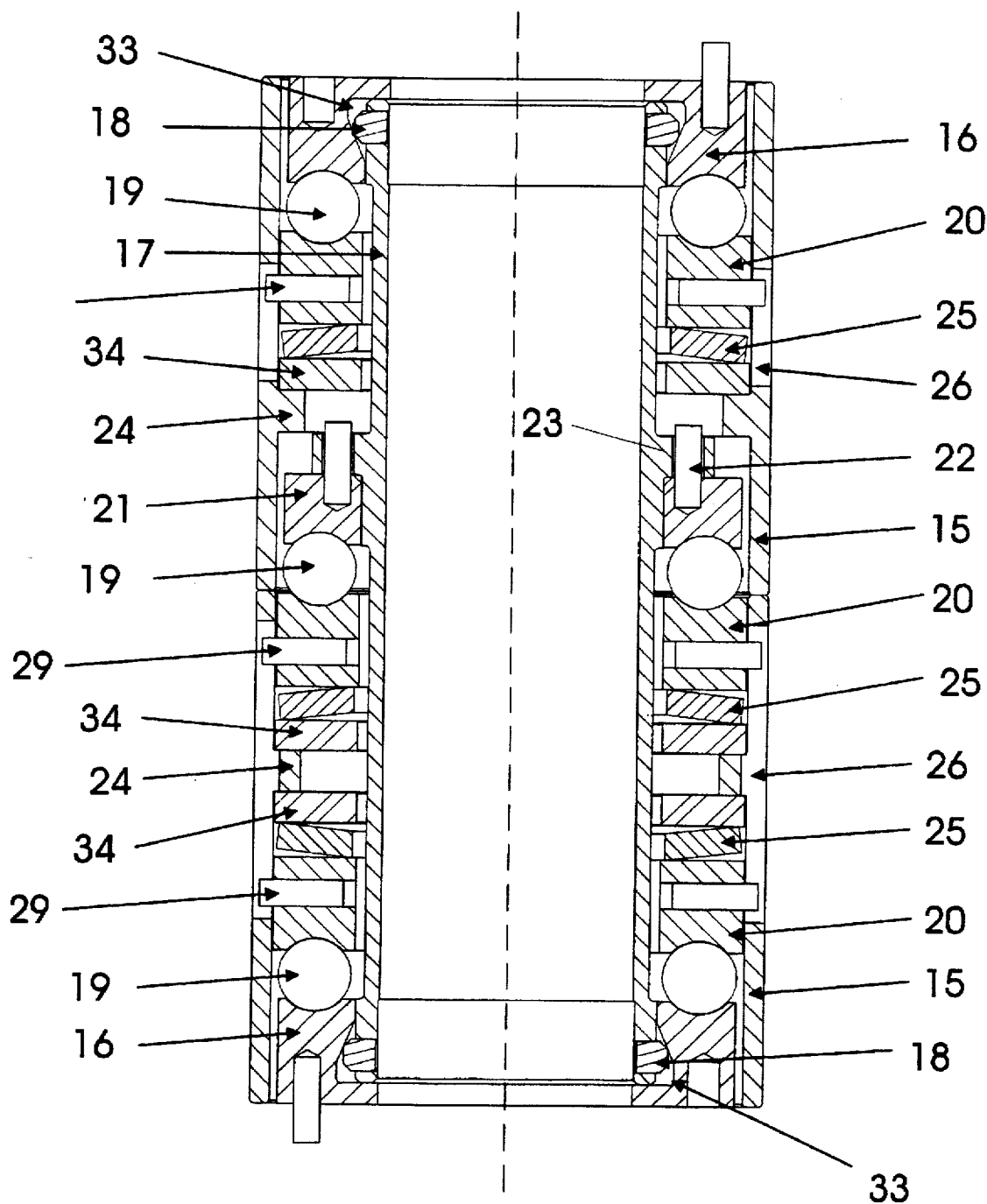
FIG. 3 shows a sectional view of an alternate preferred embodiment of an individual bearing cassette.

In accordance with the preferred embodiment of the present invention as shown in FIG. 3, in which the invention is adapted for use as a downhole tool bearing assembly, springs 25 are disposed between the races 20 and flanges 24 of the stationary external sleeve 15 for the purpose of ensuring that the respective bearing races and bearing balls remain in contact at all times. Further, pins 22 prevent relative motion of each thrust race with respect to its corresponding support sleeve. Longitudinal slots 26 are provided in each outer cylindrical sleeve 35 and 36 for the purpose of preventing relative motion between a nonrotating thrust race such as 20 and the outer sleeve by installing a pin 29 through each longitudinal slot 26 into a stationary race 20. The slots 26 are longitudinal so as to allow each stationary race 20 to travel axially, as required to permit limited axial motion of the disk springs 25 with respect to the cylindrical sleeves while still preventing rotation. The slots 26 are of sufficient length to allow for any possible travel of the race. In the preferred embodiment, a single long slot 26 is used to constrain two thrust races. This limits the number of machining motions required to create the slot. A pin-receiving hole is provided in the flange 23 of the inner rotating cylindrical sleeve 17. In addition, an annular groove 33 features a conical surface to insure that as setscrews 18 are installed, the outer rotating thrust races 16 are drawn into closer engagement with the internal support sleeve 17.

In accordance with a third embodiment of the present invention substantially as shown in FIG. 3, in which it is adapted for use as a downhole tool bearing assembly, springs 25 are disposed between the races 20 and flanges 24 of the stationary external sleeve 15 for the purpose of ensuring that the respective bearing races and bearing balls remain in contact at all times. Further, unlike as described in the preferred embodiment above, this third embodiment does not utilize the pins 22 which in prior embodiments secure the bearing races against rotation relative to the sleeve flanges 24 against which they abut. This permits the bearing races to rotate relative to the sleeve flanges against which they normally abut in a manner similar to that of a friction bearing in order to help prevent seizure of the entire thrust bearing assembly. Seizure results from a catastrophic failure of the bearing assembly which in turn results in almost immediate shutdown of the drilling operation.

Another embodiment of the present invention contemplates the use of hardened washers or spacers 34 between the disk springs 25 and the relatively soft steel of the sleeve flanges 23 and 24. This modification improves the wear characteristics of the cassette assembly by providing a hardened surface against which the disk springs can react.

It should be understood that the foregoing disclosure relates to only a preferred embodiment of the invention and that it is intended to cover all changes and modifications of the example of the invention herein chosen for the purposes of the disclosure which do not constitute departures from the spirit and scope of the invention as set forth in the claims.

What is claimed is:

1. A bearing housing assembly to support a drive shaft of a drive train of a downhole tool comprising:

a housing;

a bearing assembly including stationary and rotating bearing components located within said housing;

a compression sleeve in threaded engagement with said housing, such that rotation of said compression sleeve in a first direction causes said stationary bearing components of said bearing assembly to be compressed tightly together, thereby creating a compressive preload to ensure that said bearing components remain in contact throughout their operations; and a locknut in threaded engagement with said compression sleeve and which, in cooperation with said compression sleeve, maintains a preload through said stationary bearing components by providing an additional frictional interface capable of accepting a large torque input, thereby allowing the generation of a large mount of frictional resistance to loosening at the locknut interface.

2. A bearing housing assembly to support a drive shaft of a drive train of a downhole tool comprising:

a housing;

a bearing assembly including stationary and rotating bearing components located within said housing;

a compression sleeve in threaded engagement with said housing, such that rotation of said compression sleeve in a first direction causes said stationary bearing components of said bearing assembly to be compressed tightly together, thereby creating a compressive preload which helps to ensure that said stationary bearing components remain in contact throughout their operations;

a locknut in threaded engagement with said compression sleeve and which, in cooperation with said compression sleeve, helps maintain a preload through said stationary bearing components by providing an additional frictional interface between said locknut and said housing capable of accepting a large torque input, thereby allowing the generation of a large amount of frictional resistance to loosening at the locknut interface; and a compression ring disposed between a shoulder on the drive train and a surface of said rotating bearing component of said bearing assembly, and which is in threaded engagement with the drive train such that rotation of said compression ring in a first direction causes said rotating bearing components to be compressed tightly together, thereby creating a compressive preload which helps to ensure that said rotating bearing components remain in contact throughout their operation.

3. A downhole tool bearing housing assembly comprising:

a housing;

a drive shaft of a drive train extending through said housing;

a bearing assembly including stationary and rotating bearing components located within said housing, said bearing assembly positioned between said housing and said drive shaft;

a compression sleeve in threaded engagement with said housing, such that rotation of said compression sleeve in a first direction causes said stationary bearing components to be compressed tightly together; and a compression ring disposed between a shoulder on said drive train and a surface of said rotating bearing component of said bearing assembly, and which is in threaded engagement with said drive train such that rotation of said compression ring in a first direction causes said rotating bearing components to be compressed tightly together.

4. The assembly of claim 3, further comprising a locknut in threaded engagement with said compression sleeve and which, in cooperation with said compression sleeve, helps maintain a preload through said stationary bearing components by providing an additional frictional interface between said locknut and said housing capable of accepting a large torque input, thereby allowing the generation of a large amount of frictional resistance to loosening at the locknut interface.

5. The assembly of claim 4, wherein said drive train further comprises an upper drive connector connected to said drive shaft; and said compression ring is threadedly connected to said upper drive connector.

6. The assembly of claim 3, wherein said drive train further comprises an upper drive connector connected to said drive shaft; and said compression ring is threadedly connected to said upper drive connector.

7. A downhole tool bearing housing assembly comprising:

a housing;

a drive shaft of a drive train extending through said housing;

a bearing assembly having rotating bearing components, said bearing assembly positioned between said housing and said drive shaft, said drive shaft being rotatably powered from above said bearing assembly; and a compression ring disposed between a first surface on said drive train and a second surface of said bearing assembly, said compression ring threadedly engaged with said drive train such that rotation of said compression ring in a first direction causes said rotating bearing components to be compressed tightly together, thereby creating a compressive preload which helps to ensure that said rotating bearing components remain in contact throughout their operation.

8. The assembly of claim 7, wherein said drive train further comprises an upper drive connector connected to said drive shaft; and said compression ring is threadedly connected to said upper drive connector.

* * * * *